No. 732,218. Patented June 30, 1903.

UNITED STATES PATENT OFFICE.

WALTER B. PEARSON AND CHARLES E. ROBERTS, OF CHICAGO, ILLINOIS.

PROCESS OF SEVERING BARS OF METAL.

SPECIFICATION forming part of Letters Patent No. 732,218, dated June 30, 1903.

Application filed September 12, 1902. Serial No. 123,173. (No specimens.)

*To all whom it may concern:*

Be it known that we, WALTER B. PEARSON and CHARLES E. ROBERTS, citizens of the United States, and residents of Chicago, in the county of Cook and State of Illinois, have invented an Improved Process of Severing Bars of Metal, of which the following is a specification.

This invention relates to an improved process of severing bars of metal.

A particular application of our invention is in severing screws or screw-blanks from the bars of metal from which they are formed in the manufacture of metal screws. At the present time such screws are commonly made from bars of stock several feet in length and of a shape and size in cross-section of the desired shape and size of the screw-heads, the screws or screw-blanks being severed from the bar of stock by means of a "cut-off" tool. The width of the cut-off tool is about one-eighth of an inch, ($\frac{1}{8}''$,) and the stock removed thereby, amounting to approximately twelve per cent. of the stock in making screws one inch (1") long, is absolutely wasted. This percentage of loss varies with the length of the screws, increasing as the length of the screws decreases and decreasing as the length of the screws increases, but in all cases amounting to a large percentage of loss.

The object of the invention is to avoid this loss of stock whether in making screws or other articles; and to this end the invention consists of the various features and combinations of features hereinafter described and claimed.

In severing bars of stock according to our improved process they are first partially severed at the desired point of severance by a groove the bottom of which is angular or V-shaped. A properly-shaped cut-off tool of any ordinary form of screw-machine affords convenient means for this purpose, the bar of stock being supported in the revoluble spindle of the machine so that the end thereof will project therethrough and the cut-off tool being secured in a suitable slide or other movable support so as to be movable toward and from the bar of stock.

The expression "angular or V-shaped" is not used herein in a strictly technical sense, as in practice it is usually necessary that the point or angle of the tool which forms the groove be made somewhat blunt, either flattened or rounded, in order that it may not break or crumble under the duty to which it is subjected in cutting. By said expression "angular or V-shaped" we therefore mean a groove the bottom of which is sharply angular or bluntly angular, being either flattened or rounded in the manner and for the purpose above described.

After the bar of stock has been partially severed in the manner described the sections of the bar on opposite sides of the groove formed therein are turned or rotated relatively to each other upon their common axis, whereby said bar is twisted or wrung off at the point of partial severance thereof. This may be effected by wrenches applied to the sections of the bar of stock or where the bar is partially severed in a screw-machine by grasping the projecting end thereof in a stationary chuck supported in proper position opposite the end of the machine-spindle.

In an application for Letters Patent of the United States heretofore filed by us in the Patent Office on May 9, 1902, Serial No. 106,620, a machine is shown and described particularly designed and adapted for severing bars of stock according to our improved process, to which reference is made for a full and complete illustration and description of means for severing bars of stock according to our improved process.

We claim—

The process of severing a bar of metal consisting in partially severing said bar by a groove, the bottom of which is angular or V-shaped and in then turning the sections of said bar on opposite sides of the point of partial severance relatively to each other upon their common axis, substantially as described.

In testimony that we claim the foregoing as our invention we affix signatures, in presence of two subscribing witnesses, this 3d day of September, A. D. 1902.

WALTER B. PEARSON.
CHARLES E. ROBERTS.

Witnesses:
A. W. ANTHONY,
GEO. C. ROBERTS.